(12) United States Patent
Gray

(10) Patent No.: US 10,704,801 B2
(45) Date of Patent: Jul. 7, 2020

(54) DUCT WITH PAINT SEALANT

(71) Applicant: Martin E. Gray, Webster, NY (US)

(72) Inventor: Martin E. Gray, Webster, NY (US)

( * ) Notice: Subject to any disclaimer, the term of this patent is extended or adjusted under 35 U.S.C. 154(b) by 226 days.

(21) Appl. No.: 15/484,697

(22) Filed: Apr. 11, 2017

(65) Prior Publication Data

US 2017/0219133 A1    Aug. 3, 2017

Related U.S. Application Data

(62) Division of application No. 14/428,677, filed as application No. PCT/US2013/060113 on Sep. 17, 2013, now Pat. No. 9,651,274.

(60) Provisional application No. 61/701,945, filed on Sep. 17, 2012.

(51) Int. Cl.
| | | |
|---|---|---|
| *F24F 13/02* | (2006.01) | |
| *F16J 15/14* | (2006.01) | |
| *F16J 15/10* | (2006.01) | |
| *F16L 9/17* | (2006.01) | |

(52) U.S. Cl.
CPC ......... *F24F 13/0209* (2013.01); *F16J 15/102* (2013.01); *F16J 15/108* (2013.01); *F16J 15/14* (2013.01); *F16L 9/17* (2013.01); *F24F 13/0245* (2013.01)

(58) Field of Classification Search
CPC .. F24F 13/0209; F24F 13/0245; F16J 15/108; F16J 15/102; F16J 15/14; F16L 9/17
See application file for complete search history.

(56) References Cited

U.S. PATENT DOCUMENTS

| | | |
|---|---|---|
| 3,369,568 A | 2/1968 | Davis et al. |
| 4,438,721 A | 3/1984 | Kawamata |
| 5,195,789 A | 3/1993 | Walsh et al. |
| 5,505,230 A | 4/1996 | Bartholomew |
| 6,279,967 B1 | 8/2001 | Proctor et al. |
| 6,582,824 B1 | 6/2003 | Weigl et al. |
| 7,478,467 B2 | 1/2009 | Gudenburr et al. |
| 8,151,430 B2 | 4/2012 | Gudenburr et al. |
| 8,505,185 B2 | 8/2013 | Gudenburr et al. |

(Continued)

FOREIGN PATENT DOCUMENTS

CA    2780917 A1    11/2007

OTHER PUBLICATIONS

International Search Report and Written Opinion of the International Searching Authority in corresponding International Application No. PCT/US2013/060113 (10 pages), dated Dec. 16, 2013.

(Continued)

*Primary Examiner* — James M Hewitt, II
(74) *Attorney, Agent, or Firm* — Jodi A. Reynolds, Esq.; Harter Secrest & Emery LLP

(57) ABSTRACT

An HVAC component and method of forming the HVAC component, including a duct having a first surface and a second surface movable between an unassembled position and an assembled position is provided, wherein the method includes (a) applying a paint sealant to one of the first and the second surfaces; (b) one of drying or curing the applied paint sealant; and (c) moving the first and second surfaces from the unassembled to the assembled position, the paint sealant forming a sealed interface between the assembled first surface and second surface.

7 Claims, 5 Drawing Sheets

(56) References Cited

U.S. PATENT DOCUMENTS

| | | | |
|---|---|---|---|
| 2001/0026048 A1* | 10/2001 | Proctor | F16L 21/02 |
| | | | 277/603 |
| 2008/0303276 A1* | 12/2008 | Bloom | F16L 21/08 |
| | | | 285/363 |
| 2009/0058078 A1 | 3/2009 | Knudson | |
| 2009/0246411 A1 | 10/2009 | Fenton | |
| 2010/0316803 A1 | 12/2010 | Uang | |
| 2011/0266791 A1 | 11/2011 | Fetko | |
| 2013/0240077 A1 | 9/2013 | Gudenburr et al. | |

OTHER PUBLICATIONS

European Search Report in corresponding EP Application No. 13837965.6 (7 pages), dated Jun. 16, 2016.
Canadian Office Action in corresponding CA Application No. 2,885,289 (5 pages), dated Feb. 10, 2016.
Canadian Office Action in corresponding CA Application No. 2,885,289 (4 pages), dated Nov. 30, 2016.

\* cited by examiner

DUCT WITH PAINT SEALANT

BACKGROUND OF THE INVENTION

Field of the Invention

The present disclosure generally relates sealing ductwork and particularly to a paint sealant for sealing ductwork, such as HVAC ducts.

Description of Related Art

Round snaplock pipe and associated fittings are used within residential HVAC systems and the low pressure portions of commercial and industrial HVAC systems. It is advantageous for many reasons that the system be leak free.

It is common in the HVAC industry to install the HVAC system and after installation attempt to seal all joints and seams as well as any potential voids that offer the opportunity for leaks in the system by painting the system with a duct sealant to seal said air leaks. This process is time consuming, difficult and often ineffective due to the ductwork being located high in the air, within concealed spaces or immediately adjacent to other building components.

Recent technological advances have led to the development of sealed snaplock pipe that does not require the application of duct sealant after installation. Examples of sealant being used on snaplock pipe can be seen in U.S. Pat. Nos. 7,478,467, 7,708,034 and 8,151,430. However, these patents rely upon the accurate insertion of liquid applied gasketing sealant that hardens to occupy a substantial portion of the lock mechanism.

Existing Duct Sealants:

1. are messy and time consuming in application and the duct sealant must be allowed to dry for an extended time prior to shipping or installation;

2. result in sealant and brush marks on the fitting or snap lock mechanism which are not as aesthetically pleasing as the remainder of the system without duct sealant; and 3. application of the duct sealant to the interior of the fitting would be time consuming, likely ineffective due to the size of the fittings and not desirable due to the potential for fumes and odors that may be introduced to the conditioned air.

Therefore, the need exists for an HVAC component, including ducts, having a confronting, abutting or joined surfaces that has a paint sealant located to form a substantially sealed interface of the surfaces confronting, abutting or joining.

BRIEF SUMMARY OF THE INVENTION

The present method provides forming a duct component having a first surface and a second surface movable between an unassembled position and an assembled position, the method including the steps of applying a paint sealant to one of the first and the second surfaces; one of drying or curing the applied paint sealant; and moving the first and second surfaces from the unassembled to the assembled position, the paint sealant forming a sealed interface between the assembled first surface and second surface. The method can include applying the paint sealant by a transfer roller. The method can also include exposing the paint sealant to a predetermined radiation or heat to cure the paint sealant. It is also contemplated the paint sealant can be applied by spraying the paint sealant onto the one of the first and the second surface.

The present disclosure provides a duct component having a first surface and a second surface movable between an unassembled position and an assembled position; and a paint sealant on one of the first and the second surfaces, the paint sealant being one of dried or cured. The paint sealant can be rubberized or include any of a thermoplastic, thermoset, thermoplastic elastomer or elastomer.

Alternatively, a duct component is provided having a paint sealant on a portion of the duct component, the paint sealant being one of dried or cured.

BRIEF DESCRIPTION OF THE SEVERAL VIEWS OF THE DRAWING(S)

DETAILED DESCRIPTION OF THE INVENTION

Referring to FIGS. 1-6, the present system provides an HVAC product, such as a duct or fitting component that can be manufactured, stored, shipped and subsequently assembled to an air tight configuration without requiring the subsequent or on-site application of a sealant.

The term air tight encompasses industry standards for leakage at a given pressure (positive or negative).

The HVAC product can be any of a variety of components that can have an unassembled and an assembled configuration. The unassembled and assembled configurations encompass components that have confronting, abutting or joinable surfaces. The surfaces can be retained by mechanical interlock, fasteners, deformation or adhesives.

Further, the confronting surfaces can be in a longitudinal seam have a locking mechanism or self locking mechanism that allows two edges of sheet metal to be joined together without a separate fastener to form a duct. These longitudinal seams can be any of a variety of configurations including button lock and a reeves lock.

Figure 1:
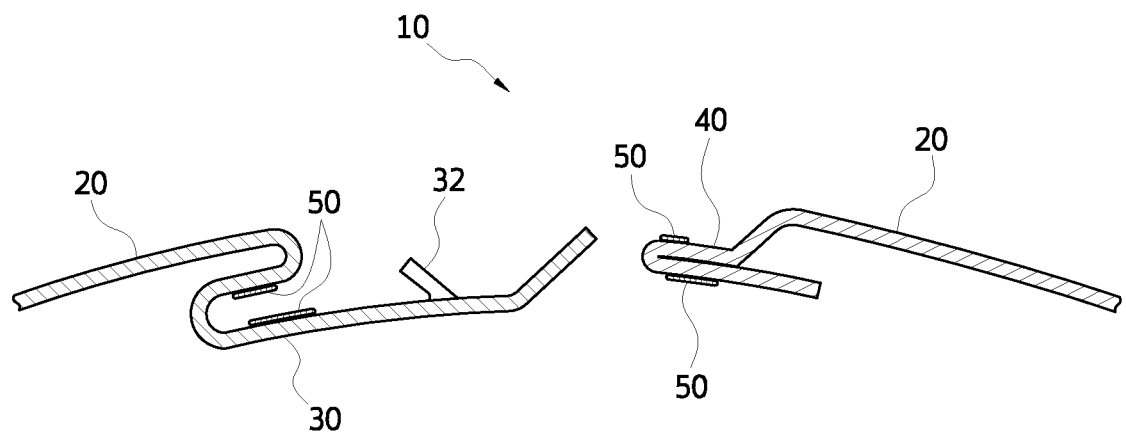
FIG. 1 is a cross sectional view of a snap lock mechanism in an unassembled or unlocked configuration.
Figure 2:
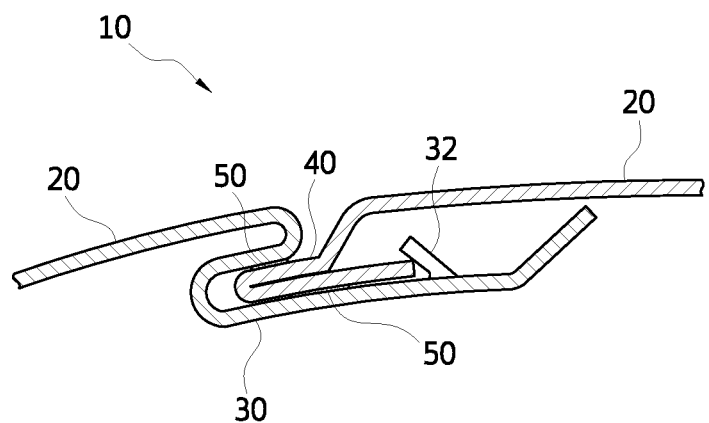
FIG. 2 is a cross sectional view of the snap lock mechanism of FIG. 1 in an assembled or locked configuration.
Figure 3:
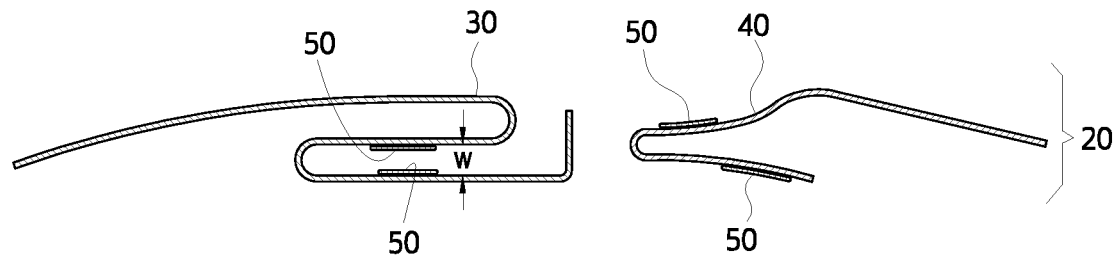
FIG. 3 is a cross sectional view of an alternative snap lock mechanism with confronting surfaces in an unassembled or unlocked configuration, showing the location of the paint sealant.
Figure 4:
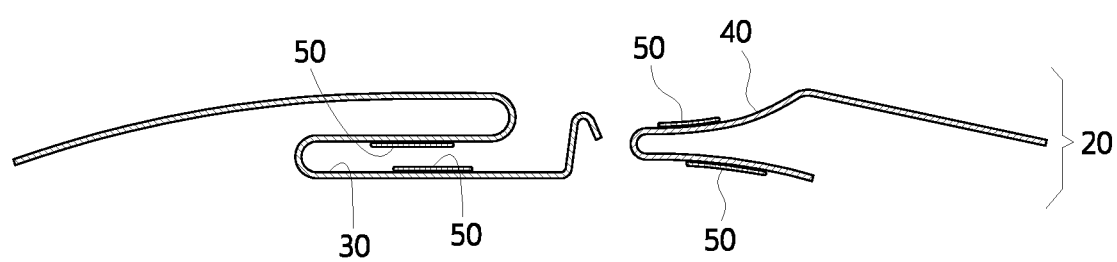
FIG. 4 is a cross sectional view of a further alternative snap lock mechanism with confronting surfaces in an unassembled or unlocked configuration, showing the location of the paint sealant.
Figure 5:
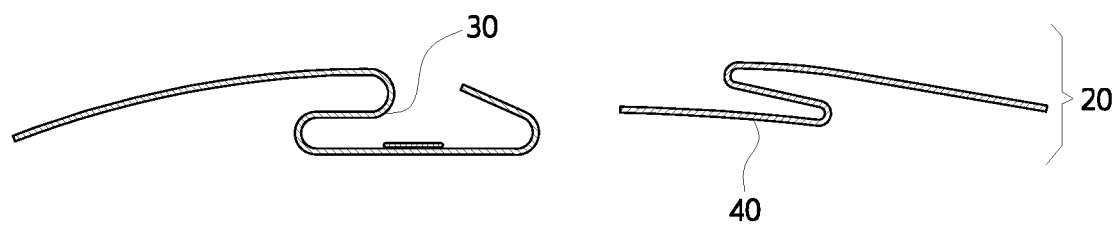
FIG. 5 is a cross sectional view of another alternative snap lock mechanism with confronting surfaces in an unassembled or unlocked configuration, showing the location of the paint sealant.
Figure 6:
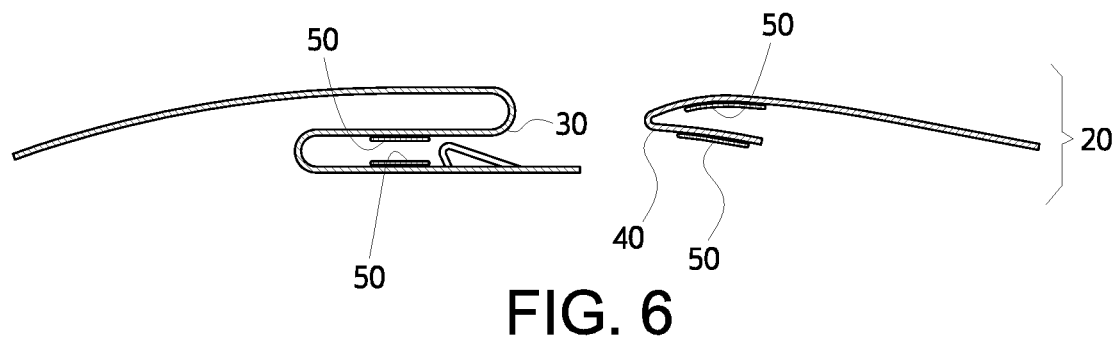
FIG. 6 is a cross sectional view of an additional alternative snap lock mechanism with confronting surfaces in an unassembled or unlocked configuration, showing the location of the paint sealant.

Representative confronting surfaces include those snap lock profiles shown in FIGS. 1 and 2 as well as those disclosed by Sheet Metal and Air Conditioning Contractors National Association (SMACNA), shown in FIGS. 3-6.

FIG. 1 shows the profile of a sheet metal duct 10 having a disengaged locking mechanism 20 in the configuration of a button lock. The locking mechanism 20 includes a female portion 30 and a male portion 40. The locking mechanism 20 can be a self locking mechanism, such as a button lock which includes a button 32 on female portion 30. If the button 32 were not formed in the locking mechanism, the locking mechanism would be in the form of a reeves lock.

As seen in the Figures, the female portion 30 defines a socket having a width W for receiving the male portion 40. For each locking mechanism, the width W has a given dimension.

A paint sealant 50 is located on a portion of at least one of the female portion 30 and the male portion 40. Although shown in the Figures on multiple surfaces of each of the female portion 30 and the male portion 40, the locations are illustrative as the specific location is at least partially dictated by the specific locking mechanism, the tolerances in the locking mechanism, the layers of paint sealant used and the desired resistance to leakage.

The paint sealant 50 has a viscosity between approximately 320 CPS (centipoise) to 100,000 CPS, with a preferred range of approximately 500 CPS to 20,000 CPS. Upon curing or drying, the paint sealant is not tacky, does not string and does not run or drip from the applied location on the lock mechanism 20.

In FIG. 2, the locking mechanism 20 of FIG. 1 is shown in the engaged or assembled configuration, wherein the male portion 40 is engaged with the female portion 30. The paint sealant 50 prevents air from escaping through the locking mechanism 20. In selected applications of the paint sealant 50, the sealant can be encapsulated by the sheet metal duct when the self locking mechanism 20 is in the assembled state. Sufficient paint sealant 50 can be applied to create a snug or tight fit between female portion 30 and male portion 40 which results in an improved connection for the locking mechanism 20. That is, reducing the available play or relative movement between the confronting surfaces, reduces the vibrational sounds generated by the duct (or fitting) during operation.

Further, by providing a compressible interface between the confronting surfaces, the paint sealant 50 can accommodate the expansion and contraction of the duct upon the passage of different temperature air.

The paint sealant 50 occupies less than 50% of the width W of the female portion 30, and in select configurations less than 30% and depending of the configuration of the lock mechanism, less than 10% to less than 5%. As the paint sealant 50 represents less material than the prior systems, the paint sealant provides increased manufacturing efficiencies.

Further, as the paint sealant 50 occupies less than 50% of the width W, and as little as 5%, the locking mechanism 20 can accommodate variations in the amount of paint sealant in the mechanism and maintain an operable interconnection.

That is, in contrast to prior systems in which it is critical to get a correct amount of sealant in the locking mechanism (too much may not cause the locking mechanism to not engage and too little will cause the locking mechanism to not seal properly), the present paint sealant 50 increases the working range of the locking mechanism with respect to the sealant.

In view of modern manufacturing capabilities, the HVAC components can be manufactured wherein the tolerances provide for gaps or interface spacing that are preferably less than 0.25 inch, and more preferably less than 0.125 inch and most preferably less than 0.0625 inch. Depending on the specific manufacturing line, the tolerances may result in gap sizing that is approximately 0.0313 inches.

As current tolerances are much tighter on HVAC products because of improved manufacturing methods, the gaps in seams are much tighter and require much less sealing materials to seal. Therefore, the present disclosure provides a relatively thick paint with sealing properties which may be ideal for seal formation and be much more cost effective and practicable as compared to the Ductmate GreenSeam™ products, and Hard Cast products or equivalents. The paint sealant 50 can also be applied via a transfer method, such as brush or roller as opposed to injection or extrusion.

Representative paint sealants 50 include Performix Brand Plasti Dip Black Rubber Coating; LOCTITE Rubber Protectant Color Guard, CRC Urethane Seal Coat Coating, BEHR Elastomeric Paint (or Sherwin Williams or Benjamin Moore) as well as Hyperflex Primer—Series 304. The paint sealant is not a paint, as the material must not only withstand the applicable fire safety codes, but the material must also provide for sealing to air tight as well accommodating compressive forces of the assembled confronting surfaces.

Elastomeric paints can be employed as the paint sealant 50. Elastomeric paints provides a waterproof paint coating that is resistant to heat, cold, sunlight, and rain. Elastomeric paint has very good elongation characteristics which can accommodate expansions and contracts of the duct.

It is contemplated the elastomeric paints can be employed in one or two coats applications. The elastomeric paints can be applied by a roller, brush, or airless paint sprayer. Typical sprayer outputs are on the order of 1 gal per min with a spray pump. An acrylic binder can be added to the elastomeric paint prior to application.

Elastomeric paints and hence coatings can have more than 4 times the thickness of commercially available latex paint. The elastomeric paints can also contain mildewcide that prevents mildew growth on damp areas.

In select configurations, the paint sealant 50 can have a specific gravity between 0.5 and 1 with an approximately weight of 5.5 pounds per gallon.

Thus, an appropriate paint sealant 50 can be selected and applied in a method that is unique to HVAC components and much less expensive, and compete with the current methods on the market.

In selected configurations, the paint sealant 50 provides at least exceed 2" w.c. of pressure and is capable of much higher pressures with minimal leakage, such as 10 inches water column. The paint sealant 50 can provide leakage rates at 2" w.c. or less of less than 0.1 cfm per linear foot for longitudinally sealed duct.

The paint sealant 50 can include additives to prevent mold or fungus, or provide different colors, or heat resistant additives can be incorporated for high temperature applications. Therefore, the paint sealant 50 has a broad market application in HVAC and flue venting of exhaust gases.

Figure 7:
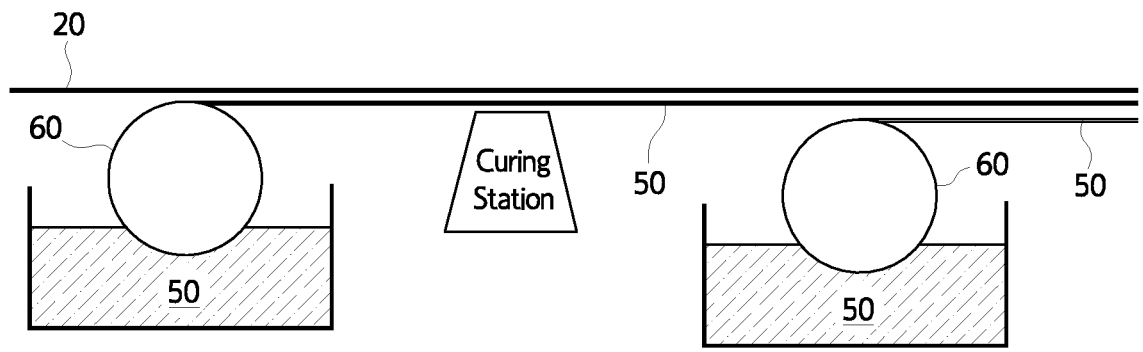
FIG. 7 is a schematic representation of the application of the paint sealant to a portion of a duct or fitting.
Figure 8:
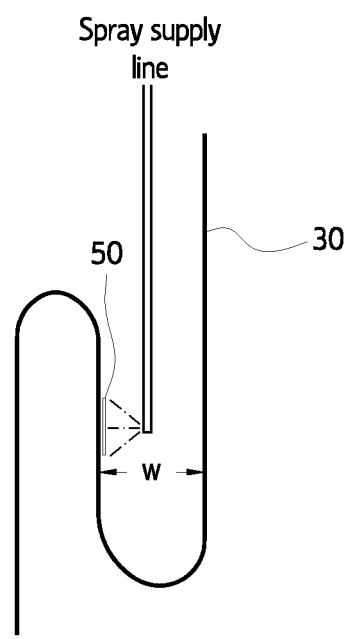
FIG. 8 is a schematic representation of an alternative application of the paint sealant to a portion of a duct or fitting.

The present system includes a method of forming a sealed pipe or duct by locating a paint sealant 50 on a predetermined portion of the duct, such that when the duct is assembled, the previously applied paint sealant contacts an opposing portion of the duct (or an opposing confronting surface having the paint sealant) and forms an at least substantially sealed interface. Thus, as seen in FIGS. 7 and 8, one could use a paint product (paint sealant), and spray or transfer the paint sealant along a male lock or a female lock, on rectangular or round residential, or commercial HVAC duct fabricated out of CRS or aluminum, coated with galvanized, PVC, oil or water based paint products, high temperature resistant paint, aluminum, or any other variety or combination of these coatings.

Additionally, the paint sealant 50 could be applied on overlapping joints or seams interlocking or riveted or dimpled, of round to round, or round to oval, or round to square or rectangular, or any other combination of these duct transitions. The sealed ducts could be used in conditioned (chilled or heated or humidified or dehumidified air) forced air, negative or positive air pressure HVAC residential and commercial systems.

The paint sealant 50 is applied during the manufacturing of the duct products at a manufacture's facility. The paint sealant can be sprayed on, or applied as a transfer paint process, as shown in FIGS. 7 and 8. The paint sealant 50 could be applied in one layer, or several layers depending on the desired seal thickness or requirement. As seen in FIG. 7, rollers 60 transfer the paint sealant from a reservoir to the HVAC component. The paint sealant 50 could be applied along any lateral, longitudinal, overlapping seam or interlocking seam, partially assembled or fully assembled, or un-assembled and shipped directly from the point of manufacture in an assembled or unassembled configuration. Heated or forced air could be used to aid in the drying or curing of the paint sealant during application in production machinery that runs at high speed, thereby reducing the drying or curing time to aid in faster manufacturing, packaging and handling of the paint sealed product.

This paint sealant 50 may not be technically considered paint but for the purpose of this description it is set forth as a paint or paint sealant. The paint sealant encompasses a rubberized oil based paint product, which can dry or cure, wherein the curing can be by agents such as ambient moisture, or by activations such as heat or radiation. That is, the paint sealant is curable. Alternative configurations of the paint sealant include thermoplastics, thermosets and elastomers, such as polyethylene, polypropylene, ABS, acrylics, polystyrene, polyester, polyurethane, nylon, polysulfone, polycarbonate, polyvinyl chloride, thermoplastic vulcanizates, urethane, styrene, polyamide and thermoplastic polyolefin.

The paint sealant 50 can be applied in a variety of thicknesses depending on the joints requiring a seal (one transfer paint roll after another, or several spray heads, as seen in FIG. 8, mounted one after another in series along the manufacturing line, to build up a sufficiently thick layer of paint sealant, thus controlling the thickness desired).

Typical thickness for the paint sealant can range from 2 mils (50.8 microns) to 31 mils to 62 mils to typically less than 125 mils.

The paint sealant 50 can be tinted a variety of colors based on application needs, and temperature requirements, or humidity requirements, such as tinted black and have metallic additives and applied to Gray Metal's black stove pipe and stove pipe fittings that are exposed to high (100° F.-1,000° F.) temperature flue gases. The paint sealant, with any desired coloring, could also be applied to other colors of wood stove flue pipe, such as but not limited to red, green, blue, or brown. The paint sealant could be applied on the small receiving end of pipe, elbows, or fittings of any configuration (round, oval, square, rectangular), and could also be applied on the large end of those same products; it would have no limits on what seams it could be applied to or joints, or joining surfaces. The paint sealant 50 could also be applied to any fixture or fastener such as an S-Cleat used to join or aid in the joining of segments one to another of an HVAC system. Different additives could be added into the paint sealant 50 to increase sealing properties (such as maintain single use or re-sealable use, or make the paint sealant more suitable for different needs such as cool humid environments, or hot dry environments, or high heat in excess of 100° F., or a combination of any of these possible environments.

The paint sealant 50 provides for the creation of a complete pre-sealed HVAC duct (residential or commercial) system direct from the manufacturer that eliminates the need for the end user to apply mastic, or duct tape, to improve the efficiency of the HVAC system by reducing or eliminating air leaks into, or out of that system. The present system would compete with current systems including a foam tape as used by other HVAC manufactures.

In one configuration, the paint sealant 50 is a rubberized paint product. Generally, this configuration of the paint sealant 50 is selected to create a seal, wherein the sealant can be color coated or coded to distinguish its specific application, and properties, and intent, so that the consumer could easily identify its specific use and application.

The paint sealant 50 is not a traditional mastic or cellular foam.

In a further configuration, the paint sealant 50 is applied into the locks or seams of black woodstove pipe. This application of the paint sealant 50 represents a novel construction of high temperature black stove pipe and fittings.

In those configurations where the paint sealant 50 is to be cured, depending on the cure mechanism a hot blower or infrared light can be positioned along the processing line downstream of the paint sealant application.

Thus, the paint sealant 50 forms a substantially solid, non-cellular structure which resides at the confronting surfaces without interfering with the assembly of the component in the assembled configuration. The paint sealant 50 provides a sufficient compression to accommodate tolerances in the confronting surfaces.

Although the paint sealant 50 has been set forth in terms of a sheet metal HVAC component, it is understood the paint sealant can be applied to venting or duct products that are coated in ceramic or painted as known in the art. Premium decorative high end venting and duct work is often painted or coated in ceramic or traditional paint products so as to provide designer finishes. However, these finishes do not address the leakage and seam sealing issues. In addition, to the sheet metal components, the paint sealant 50 can be employed with venting or duct products constructed of a variety of other materials including, but not limited to steel, galvanized steel, galvanized mild steel, aluminum, or alloy of these.

Figure 9:
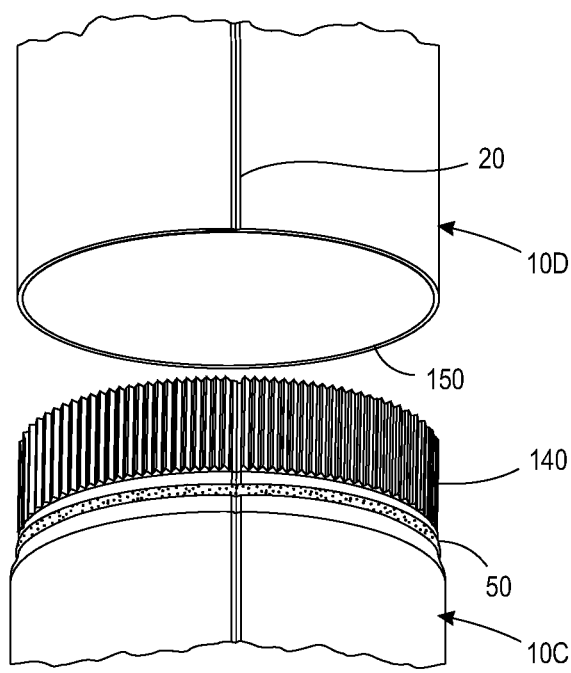
FIG. 9 is a perspective view of the application of the paint sealant to a male end of a duct or fitting.
Figure 10:
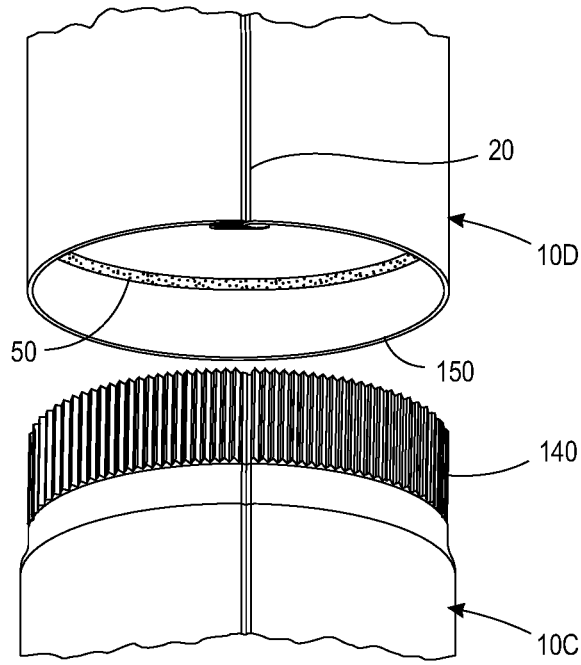
FIG. 10 is a perspective view of the application of the paint sealant to female end of a duct or fitting.
Figure 11:
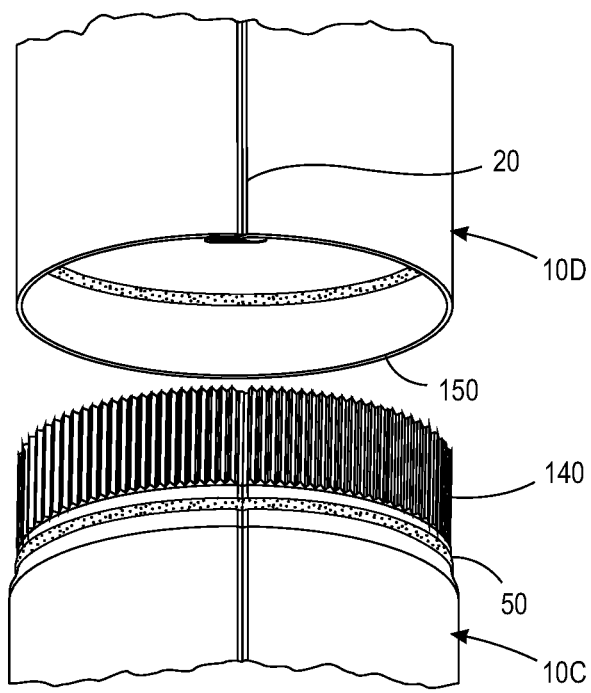
FIG. 11 is a perspective view of the application of the paint sealant to a female end of a duct or fitting and a male end of another duct or fitting.

FIGS. 9-11 show a first duct 10D and a second duct 10C, each duct 10D, 10C having a male end 140 and a female end 150, the female end 150 having a diameter larger than the diameter of the male end 140 for receiving the male end 140. As shown in FIG. 9, a non-cellular paint sealant 50 is applied to the male end 140 and located to provide a sealed interface when the male end 140 of the second duct 10C having the non-cellular paint sealant 50 is joined with the female end 150 of the first duct 10D.

As shown in FIG. 10, a non-cellular paint sealant 50 is applied to the female end 150 and located to provide a sealed interface when the male end 140 of hte second duct 10C isjoined with the female end 150 of hte first duct 10D having the non-cellular paint sealant 50.

Finally, as shown in FIG. 11, a non-cellular paint sealant 50 is applied to both the male end 140 and the female end 150 of duct 10C and duct 10D, respectively, and located to provide a sealed interface when the male end 140 of the second duct 10C is joined with the female end 150 of the first duct 10D.

The present disclosure has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A duct sealing system comprising:
   (a) a first duct and a second duct, each duct having a male end and a female end, the female end having a diameter larger than the diameter of the male end for receiving the male end;
   (b) a non-cellular paint sealant having a viscosity in the range of approximately 500 CPS to 20,000 CPS applied to one of the male end or the female end of the first duct with a thickness in the range of approximately 2 mils to less than 125 mils, and located to provide a sealed interface when the other of the male end or the female end of the second duct is joined with the male end or the female end of the first duct having the non-cellular paint sealant.

2. The duct sealing system of claim 1, wherein the non-cellular paint sealant is applied to the male end of the first duct and located to provide a sealed interface with the female end of the second duct when joined with the male end having the non-cellular paint sealant.

3. The duct sealing system of claim 1, wherein the non-cellular paint sealant is applied to both the male end of the first duct and the female end of the second duct, and wherein the non-cellular paint sealant is located to provide a sealed interface when the male end of the first duct is joined with the female end of the second duct.

4. The duct sealing system of claim 3, the non-cellular paint sealant on each of the male end of the first duct and the female end of the second duct having a substantially planar surface, wherein the substantially planar surface of the non-cellular paint sealant on the male end of the first duct overlaps the substantially planar surface of the non-cellular paint sealant on the female end of the second duct when the male end of the first duct is joined with the female end of the second duct to form a sealed interface.

5. The duct sealing system of claim 4, wherein the non-cellular paint sealant has a thickness in a range of between approximately 2 mils and 62 mils.

6. The duct sealing system of claim 1, wherein the non-cellular paint sealant seals a gap of less than 0.125 inches between the male end of a first duct and the female end of the second duct.

7. The duct sealing system of claim 1, wherein the non-cellular paint sealant has a thickness in a range between approximately 2 mils and 31 mils.

* * * * *